Oct. 14, 1958  A. SCHMIDT, JR  2,856,577
ELECTRIC CURRENT RECTIFYING SYSTEM
Filed Oct. 11, 1956
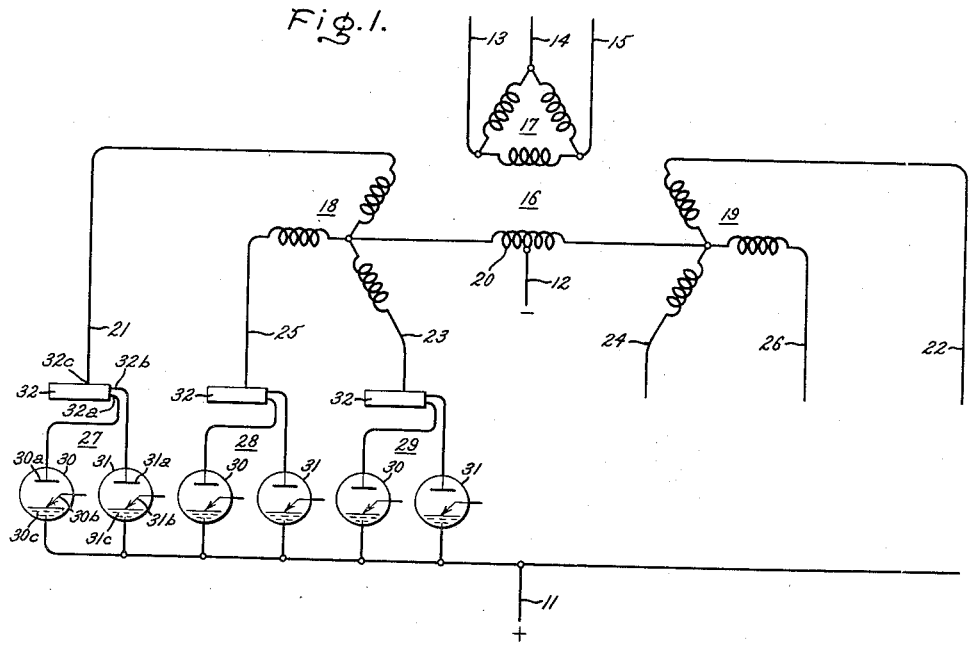
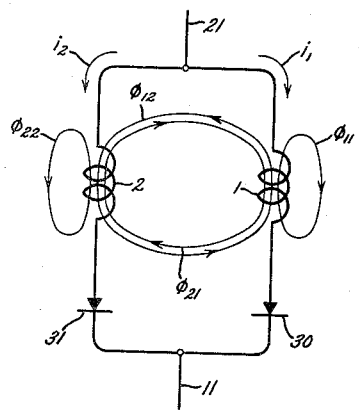
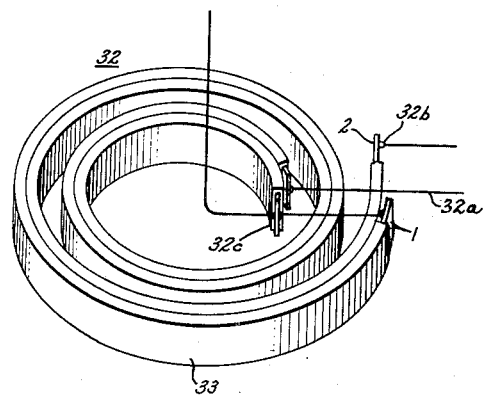
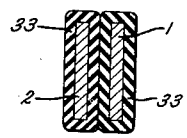
Inventor:
August Schmidt, Jr.,
by J Wesley Haubner
His Attorney.

2,856,577

Patented Oct. 14, 1958

2,856,577

ELECTRIC CURRENT RECTIFYING SYSTEM

August Schmidt, Jr., Schenectady, N. Y., assignor to General Electric Company, a corporation of New York Application October 11, 1956, Serial No. 615,319

5 Claims. (Cl. 321—27)

This invention relates to an electric current rectifying system, and more particularly to a system comprising a plurality of rectifying elements arranged for parallel operation.

In the art of electric power conversion, wherein the energy demands of direct current utilization apparatus are satisfied by rectified alternating current and voltage, it is not uncommon to connect individual rectifying elements in parallel circuit relationship in order to increase current rating. In many applications requiring such parallel operation, the rectifying elements may comprise mercury-arc tubes or the like. Conduction by a mercury-arc rectifying tube is accompanied by a significant voltage drop within the tube, and this voltage drop tends to decrease with increasing current magnitudes. Accordingly, parallel operation of such tubes will produce an unstable current balance condition unless additional system components are employed.

It has been the practice in this art to use a current-dividing compensator when paralleling two mercury-arc rectifying tubes. Such a compensator conventionally resembles an autotransformer having an equal number of primary and secondary turns. An alternating current source is connected to the common terminal of the compensator windings, and the anodes or plates of the rectifying tubes are connected to the end terminals of the windings. Whenever an unbalanced current condition exists, there is induced in the compensator a voltage tending to aid the tube which is not conducting its full share of current. In other words, the reactance of the compensator forces substantially equal current division between the parallel-connected tubes.

Mercury-arc rectifying tubes are susceptible to the undesirable phenomenon known as arc-back. An arc-back occurs when the tube fails to withstand the inverse voltage applied to its electrodes during the normally non-conductive period of its operating cycle, and current is freely conducted in the reversed direction. In effect the faulted tube in series with a normally conductive tube provides a shunt circuit of negligible impedance across a phase of the alternating current source, and the magnitude of current flow in this shunt circuit is limited only by the impedances of the associated rectifier transformer windings. The faulted tube also provides a shunt circuit across the direct current load circuits which may contribute a direct current component to the short circuit current conducted in the reverse direction during arc-back. It is necessary to prevent the magnitude of the resulting short circuit current from attaining a level which would result in permanent damage to the faulted tube or to the other system components. The aforementioned conventional compensator, which ensures proper current division between parallel-connected tubes, is unable practically to perform a satisfactory current limiting function because its iron core is quickly saturated by short circuit current. Therefore, it has been the practice to add inductive reactance in the alternating current circuits of the rectifying system, whereby the alternating current component of arc-back current may be successfully limited to a safe magnitude. Such inductive reactance is ineffective to limit the direct current component of arc-back current. Furthermore, it introduces an undesirable reactive power loss in the system and thus causes reduced power factor and poor regulation.

Accordingly, it is an object of this invention to provide an improved rectifying system having parallel-connected rectifying elements wherein a single means is employed to ensure proper current division during normal operation and to limit the magnitude of reverse current during an arc-back.

Another object of the invention is the provision, in a rectifying system having rectifying elements connected for parallel operation, of relatively small and inexpensive means for ensuring proper current division among the rectifying elements as well as for limiting both alternating and direct current components of arc-back current.

A further object of the invention is the provision of an improved rectifying system comprising a plurality of rectifying elements arranged for parallel operation and including relatively small and inexpensive means capable of forcing proper current division during normal conditions and of limiting current magnitude during arc-back conditions while having substantially no adverse effect on power factor or regulation.

In carrying out my invention in one form thereof, I provide a rectifying system comprising an alternating current phase circuit, a direct current load circuit, a pair of rectifying elements, and two magnetically coupled air-core reactors. The rectifying elements are each connected in series circuit relationship with a different one of the magnetically coupled reactors to interconnect the phase and load circuits thereby providing parallel branch circuits for conducting unidirectional current. The two reactors have a relatively high coefficient of coupling, that is, substantially all of the magnetic flux produced by one reactor interlinks the other reactor, and accordingly there are no significant net voltage drops across these reactors as long as current is properly divided between the parallel branch circuits. Whenever the rectified current in one branch changes without a corresponding change in the other branch, voltages of opposite polarities are induced in the two reactors, and these voltages are effective to restore proper current balance. Should one of the rectifying elements lose its rectifying properties, short circuit current will be conducted in a reverse direction through the associated branch circuit, but the associated reactor will provide sufficient impedance to limit the short circuit current to a safe magnitude.

My invention will be better understood and further objects and advantages will be apparent from the following description taken in conjunction with the accompanying drawing in which:

Fig. 1 is a circuit diagram of a polyphase rectifying system arranged in accordance with one embodiment of my invention;

Fig. 2 is a perspective view of magnetically coupled air-core reactors illustrating one possible construction of these components of my invention;

Fig. 3 is an end view of the reactors of Fig. 2, and

Fig. 4 is a schematic representation of the essential components of my invention.

In Fig. 1, I have shown a rectifying system for converting alternating current into direct current. The direct current output of the rectifying system supplies direct current load circuits which are represented in the drawing by a positive bus 11 and a negative bus 12. Specific utilization apparatus, not shown, may be connected to these two buses. Lines 13, 14 and 15 in the drawing represent the alternating current input circuits of the rectifying system. These alternating current circuits are supplied by a suitable source of 3-phase alternating electric power, not shown.

A conventional delta-double-Y-connected power transformer 16 is provided in the illustrated embodiment of my invention to derive 6-phase alternating voltage of suitable amplitude from the 3-phase power source. Transformer 16 comprises a set of three delta-connected primary windings 17 and two sets of three Y-connected secondary windings 18 and 19. The primary windings 17 are connected to the input circuits 13, 14 and 15. The neutral points of the two sets of Y-connected secondary windings 18 and 19 are interconnected by a conventional interphase transformer 20. The interphase transformer 20 is tapped at its center by the negative bus 12, as is indicated in Fig. 1. In a manner that is well known to those skilled in the art, the interphase transformer enables the rectifying system to function as though it were two phase-displaced 3-phase rectifiers operating in parallel.

The two sets of Y-connected transformer secondary windings 18 and 19 are connected to two groups of phase circuits. Windings 18 are connected to phase circuits 21, 23 and 25, and windings 19 are connected to phase circuits 22, 24 and 26. Each phase circuit supplies a pair of parallel-connected unilaterally conductive branch circuits. Although I have shown in Fig. 1 only those branch circuits which are associated with phase circuits 21, 23 and 25, it should be understood that identical branch circuits are associated with the phase circuits 22, 24 and 26.

As is shown in the drawing, the phase circuits 21, 23 and 25 supply three pairs of branch circuits 27, 28 and 29 respectively. Each pair of branch circuits comprises two rectifying elements 30 and 31 and a pair of mutually coupled air-core reactors. The mutually coupled reactors are represented in Fig. 1 by block symbols identified by the reference numeral 32. The reactors thus represented have separate end terminals 32a and 32b and a common end terminal 32c. The respective phase circuits 21, 23 and 25 are connected to the common terminal 32c of the reactors 32, while end terminals 32a and 32b of each reactor are connected to anodes 30a and 31a respectively of the rectifying elements 30 and 31. Cathodes 30c and 31c of the rectifying elements 30 and 31 are connected to the positive bus 11. Thus, the positive bus or load circuit 11 is connected to each of the phase circuits 21, 23 and 25 by means of the parallel combination of a pair of individual rectifying elements serially connected to different mutually coupled air-core reactors. The asymmetric current conducting properties of the rectifying elements permit current flow only in a direction from the alternating current phase circuits toward the direct current load circuit. The mutually coupled air-core reactors ensure proper current division between the paired rectifying elements and also provide a current limiting function, as will be explained in detail hereinafter.

As is shown in Fig. 1 for the purposes of illustration, the rectifying elements 30 and 31 may comprise one-way electric valves of the mercury-arc type. The cathodes 30c and 31c of such rectifying valves or tubes comprise mercury pools, and current can be conducted within each tube in only one direction, namely, from anode to cathode in the conventional sense of current direction. To initiate conduction by the tubes, starting electrodes or igniters 30b and 31b are provided. Any conventional ignition circuit, such as that shown in U. S. Patent No. 2,377,918—Moyer, issued on December 28, 1943, may be used to control the value of current transmitted to the igniter, whereby conduction is initiated at the proper instant of time during each operating cycle of the rectifying system. Since the ignition circuits form no part of my invention and the details of such circuits are not necessary for a complete understanding of the invention, such circuits have been omitted from the drawing.

I have illustrated in Fig. 2 suitable structure of a pair of mutually coupled air-core reactors which have been identified in the rectifying system of Fig. 1 by the numeral 32. Each reactor comprises an inductance coil, 1 and 2, formed by two helical turns of current conducting material having generally rectangular cross-section. The two coils 1 and 2 are wound in side-by-side flatwise engaging relationship so as to obtain extremely close magnetic coupling therebetween. As can be seen clearly in Fig. 3 which is an end view of the inductance coils, at least one thin layer of suitable insulating material 33 is interposed between adjacent coils, whereby electrical conduction between coils is prevented. The separate end terminals 32a and 32b of coils 1 and 2 respectively and the common terminal 32c are indicated in Fig. 2. Suitable supporting means, not shown, may be provided for the illustrated structure to brace the coils against magnetic forces. Each inductance coil serves as an air-core reactor, and the two coils are so closely coupled that substantially all of the magnetic flux produced by electric current flowing in one coil will interlink the other coil.

The structure suggested by Fig. 2 is relatively inexpensive to manufacture and small in size, and it is particularly well suited for the purposes of my invention. The important consideration in the design of this or other satisfactory mutually coupled air-core reactors is that they have a relatively high coefficient of coupling. In other words, the reactors should be coupled in a manner which results in negligible leakage flux. If this condition is not satisfied, the reactor will affect the regulation and power factor of the rectifier. One of the purposes of the present invention is to avoid this undesirable effect.

I have described above the detailed structure and circuitry of my improved rectifying system. The essential components of the invention are reproduced in schematic form in Fig. 4, and the manner in which the system operates to obtain the desired results will now be discussed with reference to this figure. As shown in Fig. 4, an alternating current phase circuit 21 supplies current to two parallel unilaterally conductive branch circuits which are connected to a direct current load circuit 11. One branch circuit comprises a unidirectional current conducting element 30 connected in series circuit relationship with an air-core reactor 1, and the other branch circuit comprises a second unidirectional current conducting element 31 connected in series circuit relationship with another air-core reactor 2 which is magnetically coupled to reactor 1.

The magnetic flux produced by each reactor in response to current traversing the turns thereof may be separated into hypothetical components. The total flux $\phi_1$ produced by current $i_1$ flowing in reactor 1 comprises a component $\phi_{11}$ which links only the turns of reactor 1 (leakage flux) and a component $\phi_{12}$ which links not only the turns of reactor 1 but also the turns of reactor 2 (mutual flux). In the same fashion, the total flux $\phi_2$ produced by current $i_2$ flowing in reactor 2 comprises a leakage flux component $\phi_{22}$ linking only reactor 2 and a mutual flux component $\phi_{21}$ linking both reactors 1 and 2. Since not all of each flux component actually links all of the reactor turns, the foregoing reference characters represent hypothetical quanta of flux which if linking the total turns of the respective reactors would produce products equal to the true flux linkages in question.

It will be noted that the configurations of reactors 1 and 2 are substantially identical, both reactors having the same number of turns N, and that the permeability of the air paths followed by the various components of magnetic flux is a constant equal to unity. Accordingly, for any given amount of current, the leakage flux and mutual flux components produced by one reactor will be the same as the corresponding components produced by the other reactor. As a result, both reactors have the same constant coefficients of self-inductance L $$\left(L=\frac{N\phi_1}{i_1}=\frac{N\phi_2}{i_2}\right)$$

as well as the same constant coefficients of mutual inductance M $$\left(M=\frac{N\phi_{12}}{i_1}=\frac{N\phi_{21}}{i_2}\right)$$

Due to the inductive characteristics of the reactors and the mutual coupling therebetween, voltages are induced in both reactors whenever either one is traversed by current whose magnitude is changing with time. With changing current in both reactors, the voltages induced in each comprise self-inductance and mutual-inductance components. Thus, the basic equations for the net induced voltages $e_1$ and $e_2$ of reactors 1 and 2 respectively may be written as follows:

$$e_1 = \frac{L di_1}{dt} - \frac{M di_2}{dt}$$

$$e_2 = \frac{L di_2}{dt} - \frac{M di_1}{dt}$$

The induced voltage of self-inductance, and the net induced voltage under usual circumstances, opposes the changing current which induced it. In other words, the self-induced voltage has a polarity which tends to produce current flow in the reactor circuit in the proper direction to offset the change in current. This ability to impede current change is known as inductive reactance. On the other hand, the induced voltage of mutual-inductance aids the change in reactor current and opposes the voltage of self-inductance. Therefore, the coefficient of mutual inductance M is considered a negative quantity.

Analysis of the two equations set forth above will clarify the manner in which the mutually coupled air-core reactors 1 and 2 function to ensure proper current division in the branch circuits including rectifiers 30 and 31. As long as the currents in the branch circuits are not changing, there are no induced voltages. Whenever the currents $i_1$ and $i_2$ are changing at the same rate $$\left(\frac{di_1}{dt}=\frac{di_2}{dt}\right)$$

the net induced voltages $e_1$ and $e_2$ are equal. Should current $i_1$ change without a corresponding change in current $i_2$, the self-inductance component of net voltage $e_1$ and the mutual-inductance component of voltage $e_2$ will increase. As a result, the net voltage of reactor 1 becomes greater and current $i_1$ experiences increased opposition to its change, while the net voltage of reactor 2 changes in a manner which encourages current $i_2$ to change in accordance with current $i_1$. At the same time, the anode-cathode voltages of the rectifying elements 30 and 31 will be affected in a manner tending to restore current balance. That is, the anode potential of a rectifying tube is increased or decreased depending upon whether the unbalanced condition has been caused by a deficiency or a surplus of rectified current in that tube.

Whenever an arc-back occurs in one of the rectifying elements, the resulting short circuit current can be limited to a safe magnitude by the associated air-core reactor. Suppose that rectifying element 30 experiences an arc-back and conducts currents in the reverse direction. As the reverse current attempts to increase to its peak value, it is opposed in reactor 1 by a voltage of self-inductance $$L\frac{di}{dt}$$

Under this condition, there is no negative voltage of mutual-inductance (rectifying element 31 being non-conductive), and the reactor is highly effective to impede the flow of a large quantity of current. The air core of the reactor, of course, can not be saturated by such quantities of current. With the arrangement shown, not only is the alternating current component of arc-back current effectively limited, but the rise of the direct current component of arc-back current to its potentially greatest magnitude is also significantly impeded.

The reactance presented to arc-back current will now be compared to the reactance to normal currents. During normal operating conditions, each reactor is conducting approximately one half of the total current $i$ in the associated phase circuit, and net induced voltage is $$\tfrac{1}{2}(L-M)\frac{di}{dt}$$

During arc-back, the net voltage is $$L\frac{di}{dt}$$

It will be observed that a reactor is $$\tfrac{1}{2}\left(1-\frac{M}{L}\right)$$

times less effective to impede current change during normal operating conditions than it is to impede increasing arc-back current.

The fraction $$\frac{M}{L}$$

is known as the coefficient of coupling. This fraction can be made to approach unity by designing the reactors with extremely close magnetic coupling, such as is illustrated by way of example in Fig. 2, whereby total flux produced by each reactor is substantially wholly mutual flux and the leakage flux component is negligible. With a relatively high coefficient of coupling, such as .8 or more, the mutually coupled reactors present negligible reactance to current under normal conditions, whereas the reactance increases at least tenfold whenever an arc-back condition develops.

The mutually coupled air-core reactors may be designed to have sufficiently high reactance during arc-back conditions to limit the resulting short circuit current to a predetermined safe magnitude. It should be noted at this point that the danger in excessive current magnitudes lies in the strong magnetic forces which are produced in the various electric circuits and apparatus. Such magnetic forces are proportional to current squared. Therefore, to reduce the magnitude of the forces by 50 percent, for example, it is only necessary to limit the short circuit current to 70 percent of its maximum possible magnitude.

By using a pair of air-core reactors having a relatively high coefficient of coupling, the reactance during normal operating conditions will be substantially less than during arc-back conditions. As long as current is properly divided between the parallel branch circuits, no significant net voltage drops appear across the current dividing reactors. Accordingly, the reactive power loss in the rectifying system due to the presence of these reactors is negligible, and the system power factor and regulation are substantially unimpaired.

While I have shown and described a preferred form of my invention by way of illustration, many modifications will occur to those skilled in the art. I therefore contemplate by the claims which conclude this specification to cover all such modifications as fall within the true spirit and scope of my invention.

What I claim as new and desire to secure by Letters Patent of the United States is:

1. In combination, an alternating current circuit, a direct current bus, a pair of magnetically coupled air-core reactors having a relatively high coefficient of coupling, and a pair of unidirectional current conducting means each being connected in series circuit relationship with a different one of said reactors between said circuit and said bus.

2. In combination, an alternating current phase circuit, a direct current load circuit, a pair of current rectifying elements connected in parallel circuit relationship between said phase and load circuits, and a pair of air-core reactors disposed for relatively close magnetic coupling therebetween, each of said reactors being connected in series circuit relationship with a different one of said rectifying elements.

3. An alternating current rectifying system comprising, an input circuit adapted to be connected to an alternating current source, an output circuit adapted to be connected to a direct current load, a pair of magnetically coupled air-core inductance coils having a coefficient of coupling substantially 0.8 or greater, and a pair of one-way electric valves each of which is connected in series circuit relationship with a different one of said coils between said input and output circuits.

4. A rectifying system comprising, an alternating current input circuit, a direct current output circuit, a pair of mercury-arc rectifying tubes, two mutually coupled air-core reactors having a coefficient of coupling that is substantially within the range of 0.8 to 1.0, and means connected between said output and input circuits including the parallel combination of said pair of tubes serially connected to different ones of said reactors.

5. An electric power conversion system comprising, an alternating current circuit, a direct current circuit, a pair of mutually coupled air-core reactors disposed to obtain a relatively high coefficient of coupling equal to at least 0.8, a pair of rectifying elements respectively connected in series circuit relation to said reactors to form a pair of unilaterally conductive branch circuits, and means interconnecting said alternating current and direct current circuits including said branch circuits connected in parallel circuit relationship with respect to each other.

References Cited in the file of this patent

UNITED STATES PATENTS

| | | |
|---|---|---|
| 512,340 | Tesla | Jan. 9, 1894 |
| 2,305,380 | Edwards | Dec. 15, 1942 |
| 2,337,918 | Moyer | Dec. 28, 1943 |
| 2,401,016 | Raymond | May 28, 1946 |
| 2,471,777 | Reinartz | May 31, 1949 |